US011223499B2

(12) United States Patent
Semwal et al.

(10) Patent No.: US 11,223,499 B2
(45) Date of Patent: Jan. 11, 2022

(54) INTERCONNECTING NETWORKS OPERATING DIFFERENT TYPES OF CONTROL PLANES

(71) Applicant: Arista Networks, Inc., Santa Clara, CA (US)

(72) Inventors: Rajesh Kumar Semwal, Sunnyvale, CA (US); Amit Dattatray Ranpise, San Jose, CA (US); Isidoros Kouvelas, Strovolos (CY)

(73) Assignee: Arista Networks, Inc., Santa Clara, CA (US)

( * ) Notice: Subject to any disclaimer, the term of this patent is extended or adjusted under 35 U.S.C. 154(b) by 81 days.

(21) Appl. No.: 16/696,884

(22) Filed: Nov. 26, 2019

(65) Prior Publication Data

US 2021/0160101 A1 May 27, 2021

(51) Int. Cl.
*H04L 12/46* (2006.01)
*H04L 12/66* (2006.01)
*H04L 12/935* (2013.01)

(52) U.S. Cl.
CPC .......... *H04L 12/4675* (2013.01); *H04L 12/66* (2013.01); *H04L 49/3009* (2013.01)

(58) Field of Classification Search
None
See application file for complete search history.

(56) References Cited

U.S. PATENT DOCUMENTS

| | | | |
|---|---|---|---|
| 10,887,225 B1* | 1/2021 | Chan | H04L 12/66 |
| 2015/0009806 A1* | 1/2015 | Bashandy | H04L 45/28 370/221 |
| 2015/0163133 A1* | 6/2015 | Grosser | H04L 12/462 370/400 |
| 2015/0215198 A1* | 7/2015 | Wijnands | H04L 45/245 370/392 |
| 2018/0091419 A1* | 3/2018 | Bickhart | H04L 45/50 |
| 2018/0337852 A1* | 11/2018 | Gunalan | H04L 45/507 |
| 2020/0127913 A1* | 4/2020 | Filsfils | H04L 45/52 |

* cited by examiner

*Primary Examiner* — Jay L Vogel
(74) *Attorney, Agent, or Firm* — Fountainhead Law Group P.C.

(57) ABSTRACT

Techniques described herein relate to a method for generating a table for forwarding traffic between networks that are implemented using different types of control planes. In one or more embodiments, the method comprises: receiving a first route advertisement for a first network; extracting a first next hop identifier-multiprotocol label switching (MPLS) label combination; receiving another route advertisement for the first network; and in response to determining that a local label has not been assigned to the first next hop identifier-MPLS label combination: generating a first entry and adding the first entry to a forwarding table of the gateway device.

19 Claims, 9 Drawing Sheets

INTERCONNECTING NETWORKS OPERATING DIFFERENT TYPES OF CONTROL PLANES

BACKGROUND

The present disclosure relates to routing traffic between networks implemented using different types of control planes (e.g., an ethernet virtual private network (EVPN) control plane and a layer 3 virtual private network (L3 VPN) control plane).

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

When connected networks are implemented using different types of control planes, devices in one network cannot interpret routes advertised by devices in another network, and vice versa. Consequently, devices in one network do not have direct routes to devices in the other network and cannot see the internal configuration of the other network.

Described herein are systems and methods for configuring a gateway provider edge (PE) device inserted in a data path between such networks to generate a forwarding table including local labels for routing traffic between the networks. When the gateway PE device receives a route advertisement from a PE device advertising a path to a first network, the gateway PE device extracts a next hop (NH) identifier and a multiprotocol label switching (MPLS) label (referred to herein as a NH identifier-MPLS label combination) from the route advertisement, assigns a local label to the NH identifier-MPLS label combination, and stores an entry associating the local label with the NH identifier-MPLS label combination in the forwarding table. When the gateway PE device exports the route to a PE device advertising a path to a second network, the gateway PE device replaces the MPLS label in the route advertisement with the assigned local label and sets itself (i.e., the gateway PE device) as the NH. This causes the PE device advertising a path to the second network to send data packets destined for the first network to the gateway PE device.

Local labels may be assigned by the gateway PE device to NH identifier-MPLS label combinations using various approaches. In some embodiments, a different local label is assigned to and associated with each unique NH identifier-MPLS label combination. In other embodiments, a per-NH list local label allocation scheme is employed in which each local label is assigned to and associated with a set (or list) of NH identifier-MPLS label combinations that provide a path to a particular IP prefix. In still other embodiments, a per-prefix local label allocation scheme is employed in which a different local label is assigned to each IP prefix for which route advertisements are received and is associated with a set of NH identifier-MPLS label combinations that provide a path to that IP prefix.

In each of the three local label allocation schemes described above, a local label is assigned to a set of NH identifier-MPLS label combinations. In the first scheme, the set includes only a single NH identifier-MPLS label combination. In the second and third schemes, the set includes all NH identifier-MPLS label combinations that provide a path to a given IP prefix (with the difference being that in the third scheme, one or more NH identifier-MPLS label combinations may be included in multiple sets (and be associated with multiple local labels) if they provide paths to multiple IP prefixes).

In some embodiments, if the gateway PE device subsequently receives a route advertisement from a new PE device advertising a path to the first network, a new label is created. The gateway PE device then retrieves the NH identifier-MPLS label combinations associated with the existing local label and adds those NH identifier-MPLS label combinations to the entry for the new local label, along with a NH identifier-MPLS label combination extracted from the newly received route advertisement. The gateway PE device then determines whether the existing local label is used by other networks (i.e., if the NH identifier-MPLS label combinations associated with the existing local label were also included in route advertisements for other IP prefixes). If no other networks use the existing local label, the existing local label is deleted. Otherwise, if other networks use the existing local label, and the new PE device has not provided a route advertisement for those other networks, the local label is maintained but is no longer associated with the first network.

When the gateway PE device receives a data packet with a local label from a PE device advertising a path to the second network, the gateway PE device retrieves, from the forwarding table, the NH identifier and MPLS label in the entry for the local label, replaces the local label with the MPLS label, and forwards the data packet to a device having the NH identifier. In embodiments where a local label is assigned to a set of NH identifier-MPLS label combinations, when the gateway PE device receives a data packet with a local label, the gateway PE device may select one of the paths that provides connectivity to the first network. For example, the gateway PE device may perform a BGP best-path determination to select one of the NH identifier-MPLS label combinations in the set associated with the local label. The gateway PE device then retrieves, from the forwarding table, the NH identifier and MPLS label of the selected path, replaces the local label with the retrieved MPLS label, and forwards the data packet to the device having the NH identifier.

In embodiments using the per-prefix local label allocation scheme, an individual PE device advertises paths to multiple IP prefixes (i.e., subnets). In such embodiments, the gateway PE device may assign different local labels to each IP prefix even though route advertisements for the different IP prefixes include the same NH identifier-MPLS label combination(s). The gateway PE device may maintain a routing table indicating which local labels are assigned to which IP prefixes. Upon receiving a route advertisement, the gateway PE device extracts, from the route advertisement, an IP prefix identifier and determines whether a local label has previously been assigned to that IP prefix. If a local label has not been assigned to that IP prefix, the gateway PE device adds an entry to the routing table assigning a local label to the IP prefix and uses the assigned local label when exporting the route as described above.

Figure 1A:
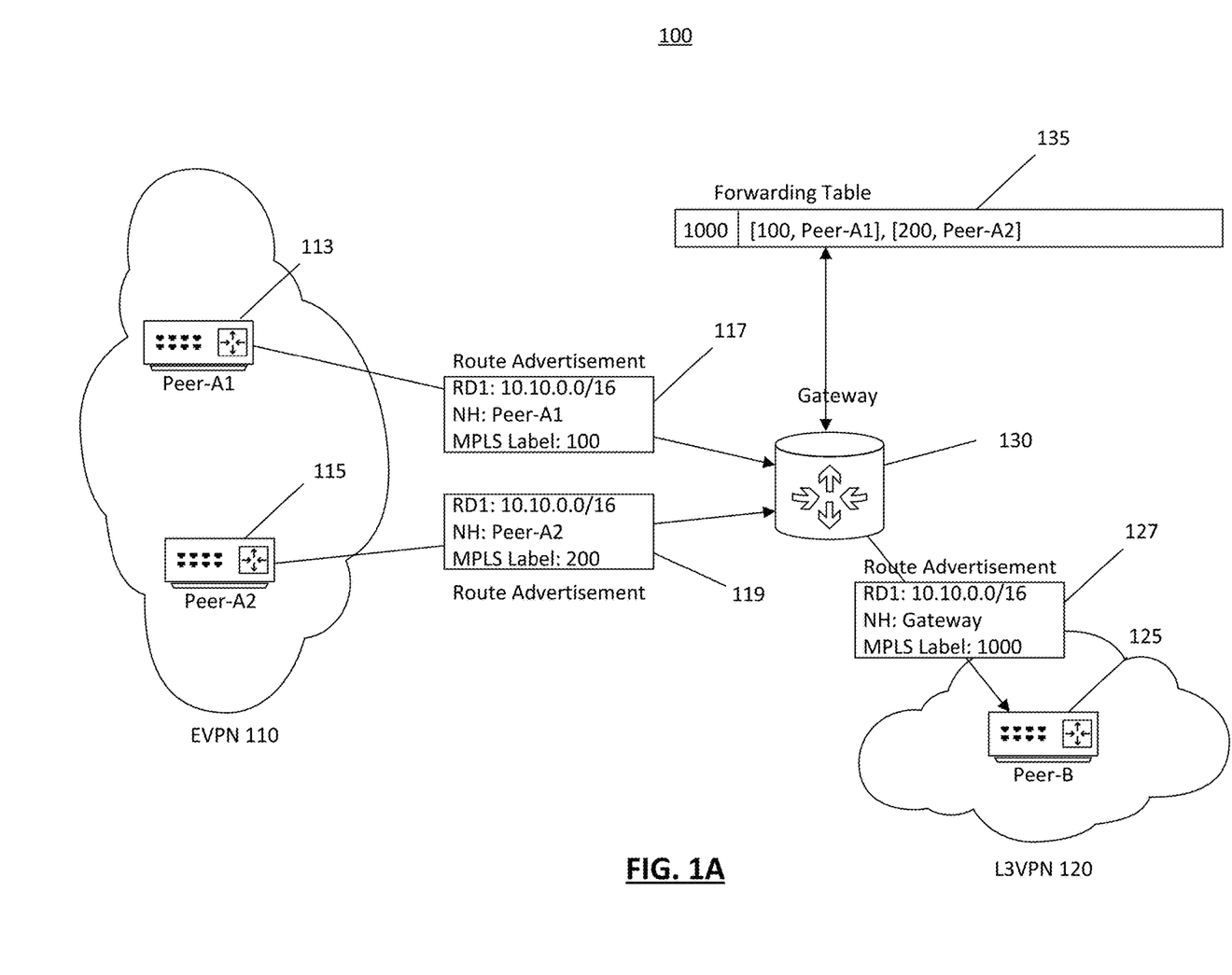
FIG. 1A shows illustrative diagram of a procedure for using local labels for forwarding traffic between networks that are implemented using different types of control planes, in accordance with some embodiments of the disclosure.

FIG. 1A shows an illustrative diagram of a process 100 for using local labels to route traffic between networks that are implemented using different types of control planes. In particular, FIG. 1A shows an ethernet virtual private network (EVPN) 110 that is interconnected with a layer 3 (L3) virtual private network (VPN) 120 via a gateway device 130. EVPN 110 is shown as including PE devices 113 and 115 (also referred to as Peer-A1 and Peer-A2, respectively), and L3VPN 120 is shown as including a PE device 125 (also referred to as Peer-B). PE devices 113 and 115 maintain an EVPN session with gateway device 130, and PE device 125 maintain a L3VPN session with gateway device 130.

PE device 113 transmits a route advertisement 117 advertising a path to EVPN 110 to gateway device 130. Route advertisement 117 includes, among other things, fields for a route distinguisher (RD), a NH identifier, and an MPLS label. The RD identifies EVPN 110, the NH identifier identifies the device that is the next hop for reaching EVPN 110 via the path advertised by route advertisement 119 (in this case, it is Peer-A1), and the MPLS label is a label assigned by PE device 113 to that path (in this case, the label is 100). Similarly, PE device 115 transmits a route advertisement 119 advertising a path to EVPN 110 to gateway device 130. Route advertisement 119 includes the same fields as route advertisement 117. In route advertisement 119, the RD identifies EVPN 110, the NH identifies the device that is the next hop for reaching EVPN 110 via the path advertised by route advertisement 119 (in this case, it is Peer-A2), and the MPLS label is a label assigned by PE device 115 to that path (in this case, the label is 200).

Gateway device 130 maintains a forwarding table 135 for all routes it receives. When gateway device 130 receives route advertisements 117 and 119, it assigns a local label to all the routes that share the same RD (and thus provide access to the same network, in this case, EVPN 110) and creates a single entry in forwarding table 135 for that local label. The entry in forwarding table 135 includes, as a key, the local label, and as a value, a MPLS label and NH identifier (also referred to as a NH identifier-MPLS label combination). In the example shown in FIG. 1A, forwarding table 135 includes a single entry for a local label 1000, which includes the values "100, Peer-A1," and "200, Peer-A2.") In some embodiments, each entry in forwarding table 135 comprises a unique local label and a single NH identifier-MPLS label combination. For example, each entry includes a unique NH identifier-MPLS label combination and a unique local label. In other embodiments, some entries in forwarding table 135 comprises a unique local label and a plurality of NH identifier-MPLS label combinations. For example, as shown in FIG. 1A, the entry in forwarding table 135 includes multiple NH identifier-MPLS label combinations associated with a single local label.

Gateway device 130 then generates and transmits a route advertisement 127 advertising (or exporting), to PE device 125, the routes to EVPN 110. Instead of generating separate route advertisements for each route to EVPN 110, gateway device 130 generates a single route advertisement 127 using the local label assigned to it assigned to the routes to EVPN 110. Thus route advertisement 127 includes the same fields as route advertisements 117 and 119, but while the RD value is the same as in route advertisements 117 and 119, the NH identifier is set to an identifier of gateway device 130, and the MPLS label is set to the local label (in this case, 1000). After receiving route advertisement 127, PE device 125 will forward data traffic destined for devices in the network represented by the RD included in the route advertisement 127 to gateway device 130 and adds the local label 1000 to such data packets.

Figure 1B:
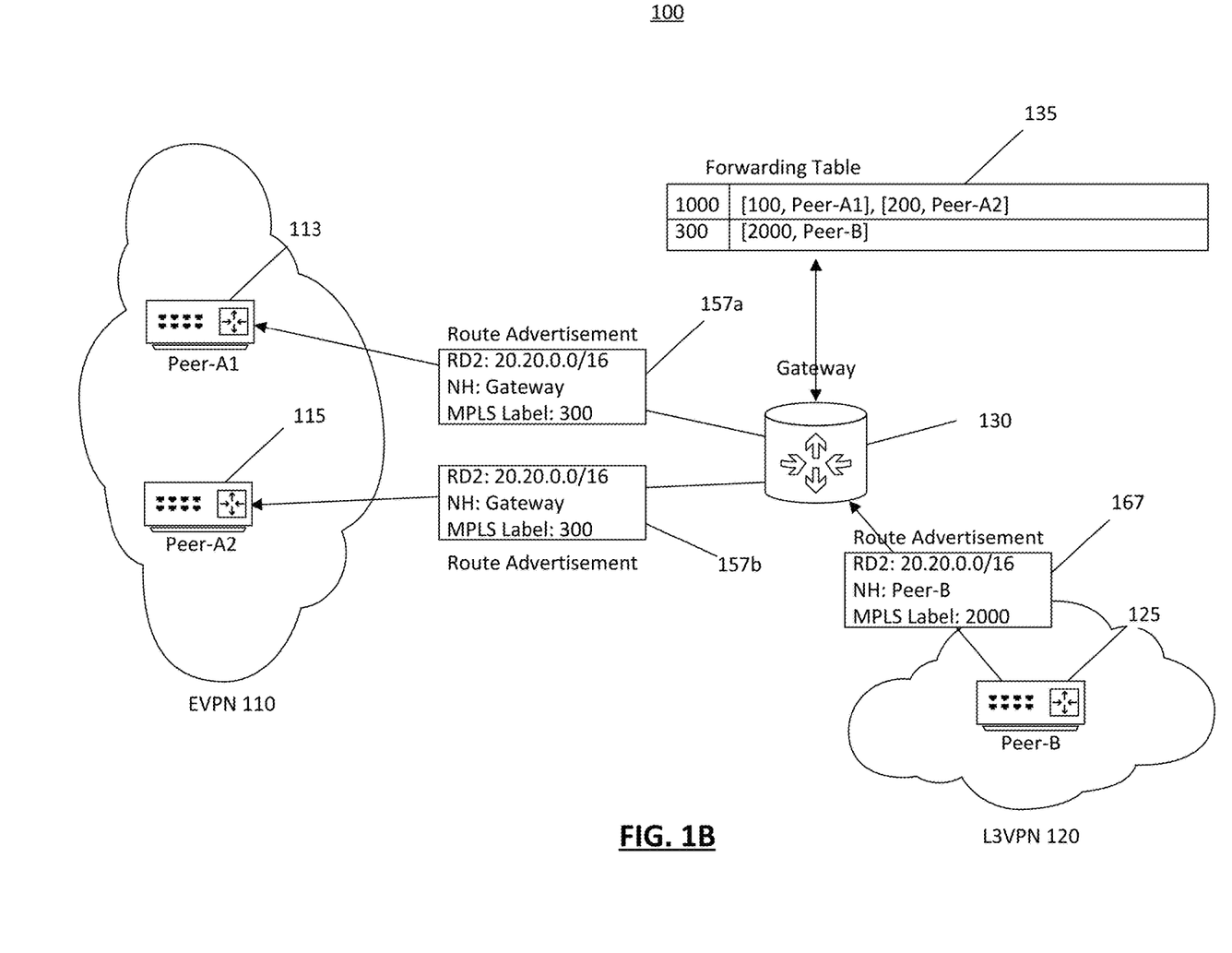
FIG. 1B shows another illustrative of a procedure for using local labels for forwarding traffic between networks that are implemented using different types of control planes, in accordance with some embodiments of the disclosure.

FIG. 1B shows another illustrative diagram of process 100 for using local labels to route traffic between networks that are implemented using different types of control planes. In FIG. 1B, the process is reversed from what is shown in FIG. 1A. Specifically, in FIG. 1B, PE device 125 transmits a route advertisement 167 advertising a path to L3VPN 120 to gateway device 130. Route advertisement 167 includes the same fields as route advertisements 117, 119, and 125 of FIG. 1A. As shown in FIG. 1B, route advertisement 167 includes an RD identifying L3VPN 120, a NH identifier identifying PE device 125 (in this case, Peer-B), and an MPLS label assigned by PE device 125 to the path advertised by route advertisement 167 (in this case, 2000).

Upon receiving route advertisement 167, gateway device 130 assigns a local label to the route advertised by route advertisement 167 and adds an entry for the local label to forwarding table 135. As shown in FIG. 1B, gateway device 130 adds to forwarding table 135 an entry having local label 300 as the key, and the NH identifier identifier-MPLS label combination "2000, Peer-B" as the value.

Gateway device 130 then generates a route advertisement advertising (or exporting) the route to L3VPN 120. Gateway device 130 transmits this route advertisement (shown as route advertisements 157a and 157b in FIG. 1B) to PE devices 113 and 115. In this case, only a single route to L3VPN 120 has been received, but those skilled in the art will appreciate that, as shown in FIG. 1A, if multiple routes to L3VPN 120 are received, gateway device 130 will assign a single local label to the collection of routes to L3VPN 120, generate a single route advertisement including that local label, and transmit that route advertisement to each PE device in EVPN 110 with which it maintains and EVPN session.

Route advertisement 157a/157b includes the same fields as route advertisements 117, 119, and 125 of FIG. 1A, and route advertisement 167 of FIG. 1B. Specifically, route advertisement 157a/157b includes an RD identifying L3VPN 120, a NH identifier set to an identifier of gateway device 130, and an MPLS label set to the local label (in this case, 300) that gateway device 130 assigned to the routes to L3VPN 120. After receiving route advertisement 157a or 157b, PE devices 113 and 115, respectively, will forward data traffic destined for devices in the network represented by the RD included in the route advertisement 157a or 157b to gateway device 130, and add the local label 300 to such data packets.

Figure 2:
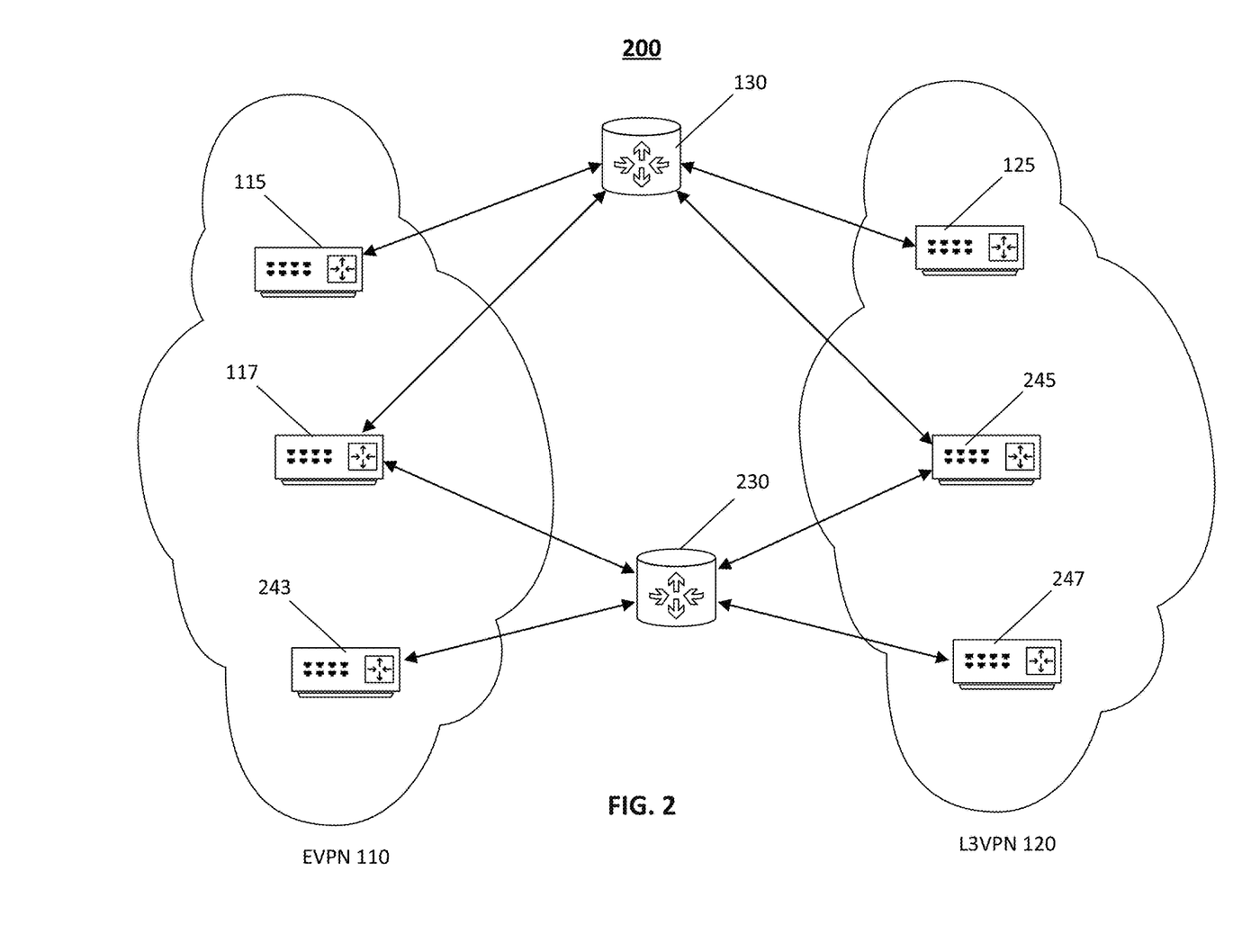
FIG. 2 shows an illustrative network topology of a system for using local labels for forwarding traffic between networks that are implemented using different types of control planes, in accordance with some embodiments of the disclosure.

FIG. 2 shows an illustrative network topology of a system 200 for using local labels for forwarding traffic between networks that are implemented using different types of control planes. System 200 includes two gateway devices 130 and 230 in a data path between EVPN 110 and L3VPN 120. EVPN 110 includes a plurality of PE devices (shown as PE devices 115, 117, and 243). Likewise, L3VPN 120 includes a plurality of PE devices (shown as PE devices 125, 245, and 247). As shown in FIG. 2, PE devices 115 and 117 maintain an EVPN session with gateway device 130, while PE devices 125 and 245 maintain a L3VPN session with gateway device 130. Similarly, PE devices 117 and 243 maintain an EVPN session with gateway device 230, and PE devices 245 and 247 maintain a L3VPN session with gateway device 230. Those skilled in the art will appreciate that this example is merely illustrative, and that both EVPN 110 and L3VPN 120 may include any number of PE devices, and that additional gateway devices may be included in the data path between EVPN 110 and L3VPN 120. In some embodiments, all PE devices in EVPN 110 maintain an EVPN session with a single gateway device, or all maintain an EVPN session with multiple gateway devices simultaneously, and likewise for L3VPN 120. In other embodiments (similar to what is shown in FIG. 2), different PE devices maintain EVPN (or L3VPN) sessions with different (and potentially multiple) gateway devices.

Figure 3:
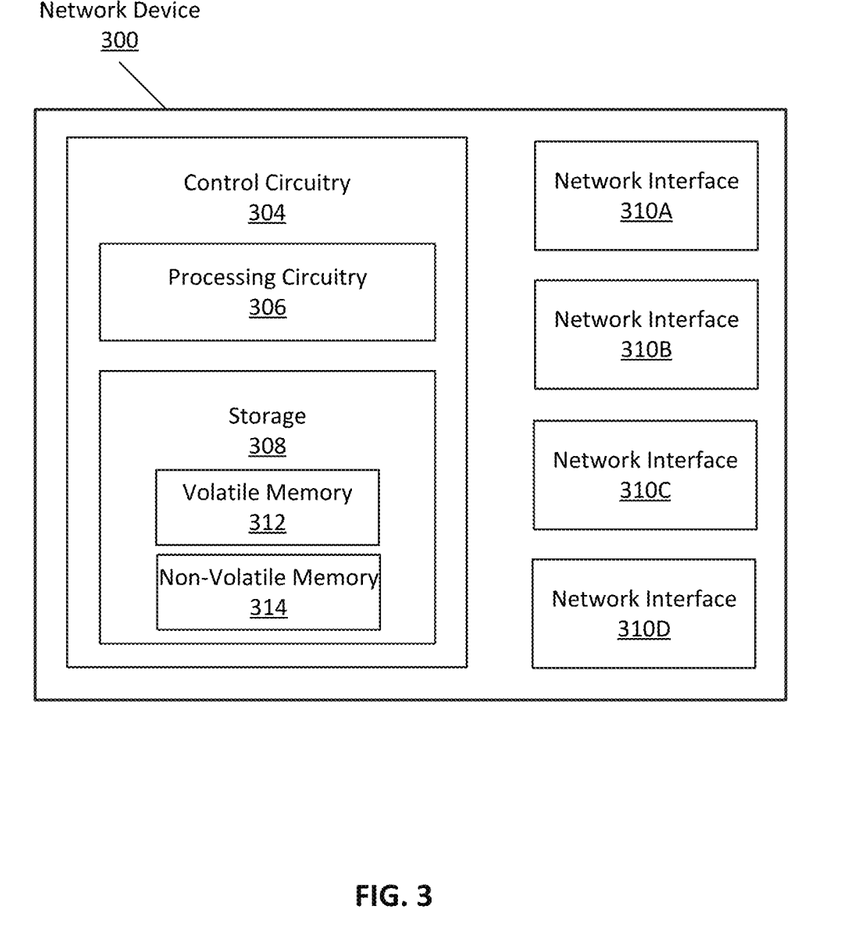
FIG. 3 shows a diagram of an illustrative network device for using local labels for forwarding traffic between networks that are implemented using different types of control planes, in accordance with some embodiments of the disclosure.

FIG. 3 shows a generalized embodiment of a network device 300. As depicted, network device 300 may be a router, a switch, and/or any other network device configured to receive network traffic (e.g., route advertisements and/or data packets) from a first device and forward the network traffic to a second device, such as by performing a local label lookup in a forwarding table. Those skilled in the art will recognize that PE devices 115, 117, and 125, and gateway device 130 of FIG. 1A, as well as PE devices 243, 245, and 247, and gateway device 230 of FIG. 2 may be implemented as network device 300. Network device 300 may receive network traffic (e.g., route advertisements 117, 119, and 167) via a network interface (e.g., network interface 310A), and provide the route advertisements to control circuitry 304, which includes processing circuitry 306 and storage 308, in order to assign local labels to the advertised routes, generate entries in a forwarding table (e.g., forwarding table 135) for the local labels. While network device 300 is shown as including four network interfaces (e.g., network interfaces 310A, 310B, 310C, and 310D), this is merely illustrative, and those skilled in the art will appreciate that network device 300 may include any number of network interfaces, and that the network interfaces may be of any type of wired or wireless network interface, such as RJ45 ethernet ports, a coaxial ports, logical ports, wireless interfaces (e.g., 802.11x interfaces, BLUETOOTH interfaces, cellular interfaces, etc.

Control circuitry 304 may be based on any suitable processing circuitry, such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 304 executes instructions for extracting RDs, NH identifiers, and MPLS labels from route advertisements, assigning local labels to the advertised routes, generated entries in a forwarding table for the local labels, and generating new route advertisements including the local labels to advertise the routes, as described further below with reference to FIGS. 4A-5C. Control circuitry 304 may further transmit route advertisements 127 and 157a/157b to other devices connected to network device 300.

Storage 308 may include volatile random-access memory (RAM) 312, which does not retain its contents when power is turned off, and non-volatile RAM 314, which does retain its contents when power is turned off. In some embodiments, storage 308 may be an electronic storage device that is part of control circuitry 304. As referred to herein, the phrase "electronic storage device" or "storage device" should be understood to mean any device for storing electronic data, computer software, instructions, and/or firmware, such as random-access memory, content-addressable memory, hard drives, optical drives, solid state devices, quantum storage devices, or any other suitable fixed or removable storage devices, and/or any combination of the same. In some embodiments, forwarding table 135 is stored in storage 308. In other embodiments, forwarding table 135 may be stored on a separate device and a link to forwarding table 135 may be stored in storage 308. The circuitry described herein may execute instructions included in software running on one or more general purpose or specialized processors. Multiple circuits may be provided to handle simultaneous processing functions.

FIGS. 4A, 4B, 4C, and 4D show a flowchart for an illustrative process 400 for maintaining a forwarding table including local labels, in accordance with some embodiments of the disclosure. Process 400 may begin at block 402, where control circuitry, such as control circuitry 304 of network device 300 (FIG. 3), receives a route advertisement (e.g., route advertisement 117) advertising a route to a first network (e.g., EVPN 110). Route advertisement 117 may originate at PE device 113 and may be shared with all network devices on the network that maintain an EVPN session with PE device 113. As noted above with reference to FIG. 1A, route advertisement 117 includes a RD identifying EVPN 110, a NH identifier identifying the network device from which the route advertisement is received (in this instance, PE device 113), and a MPLS label.

Figure 4A:
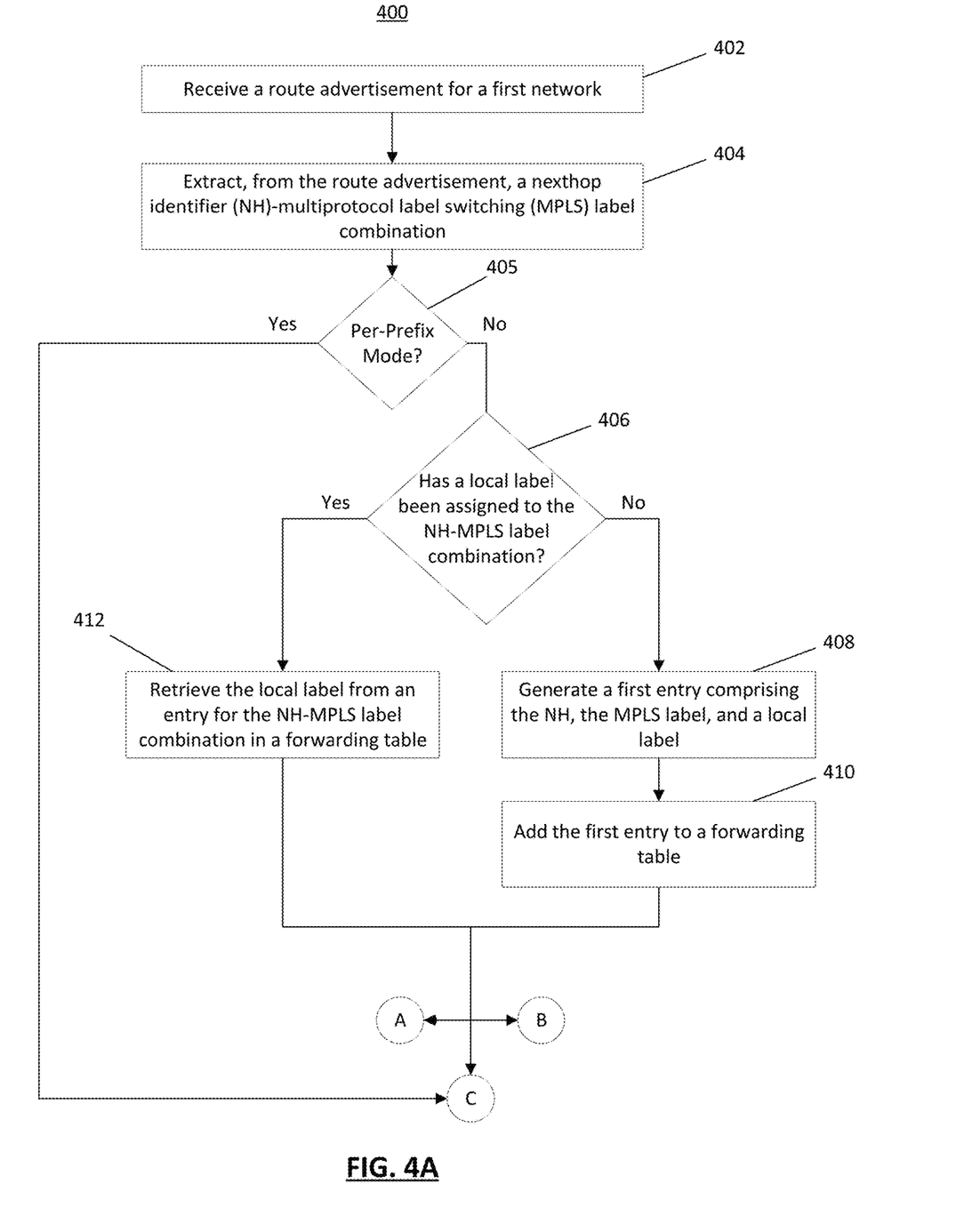
FIG. 4A is a flowchart of an illustrative process for maintaining a forwarding table including local labels, in accordance with some embodiments of the present disclosure.

At block 404, control circuitry 304 extracts, from the route advertisement received at block 402, a NH identifier-MPLS label combination including a NH identifier and MPLS label. For example, control circuitry 304 extracts, from route advertisement 117, the NH identifier identifying PE device 113, and the MPLS label assigned by PE device 113 to the route. In some embodiments, route advertisement 117 includes multiple NH identifier-MPLS label combinations. In such embodiments, control circuitry 304 may extract multiple or all of the NH identifier-MPLS label combinations and iteratively and/or in parallel perform the functions described below for each NH identifier-MPLS label combination.

Figure 4B:
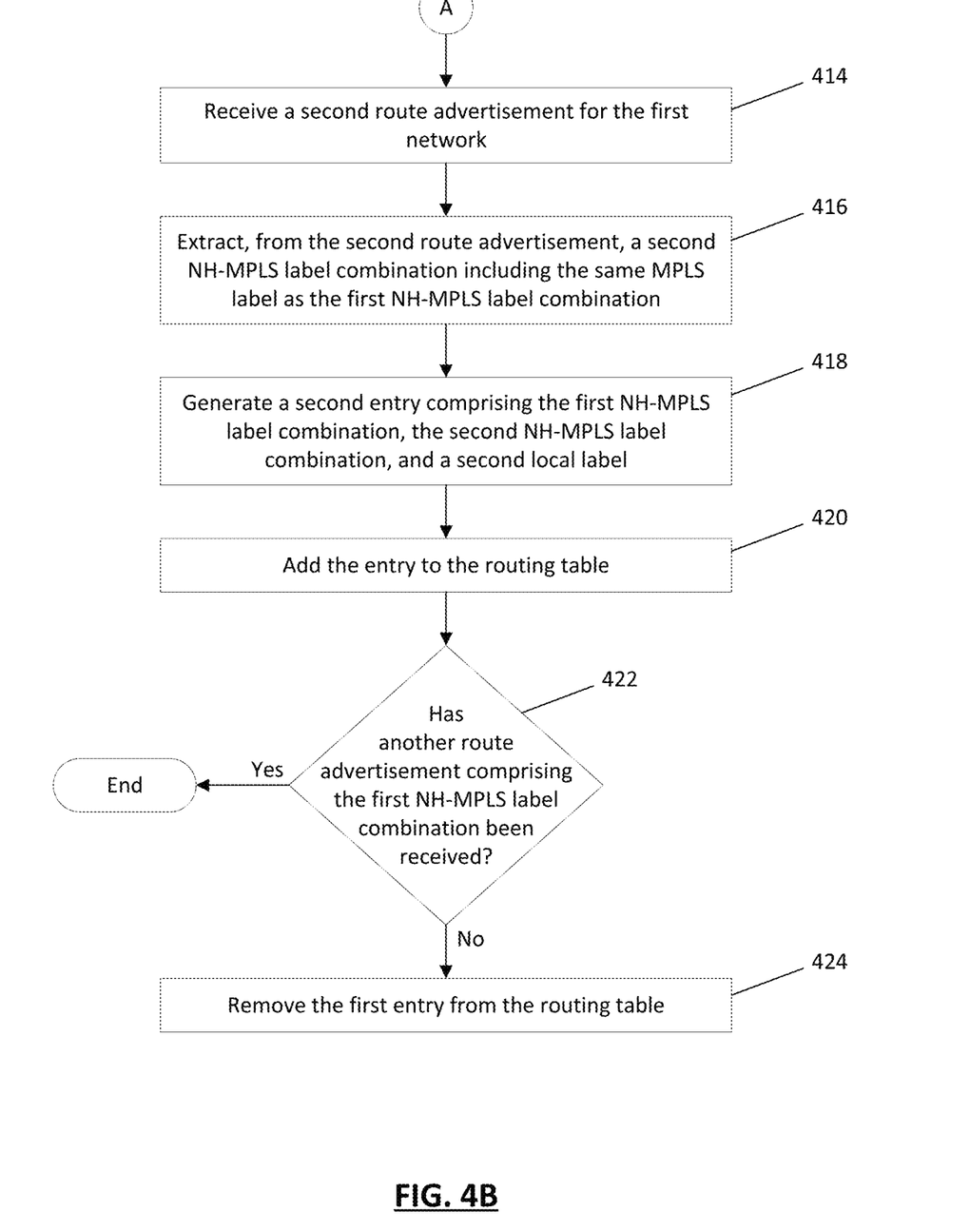
FIG. 4B is a flowchart showing further aspects of the illustrative process for maintaining a forwarding table including local labels, in accordance with some embodiments of the present disclosure.
Figure 4C:
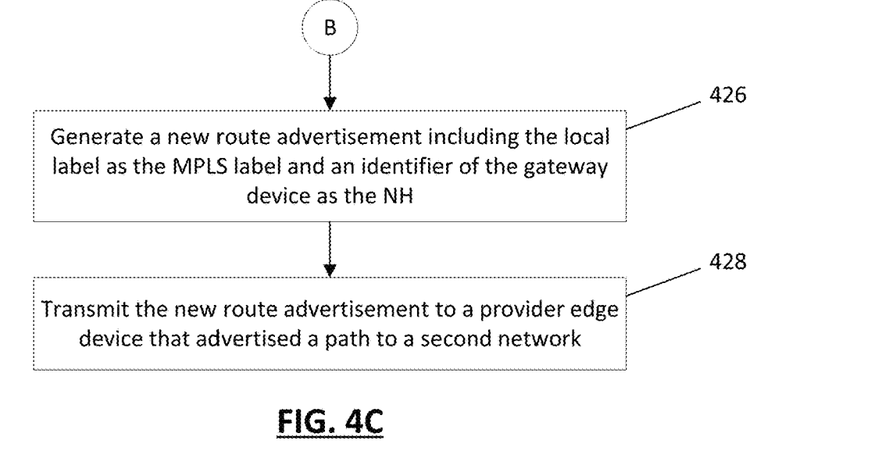
FIG. 4C is a flowchart showing yet further aspects of an illustrative process for maintaining a forwarding table including local labels, in accordance with some embodiments of the present disclosure.
Figure 4D:
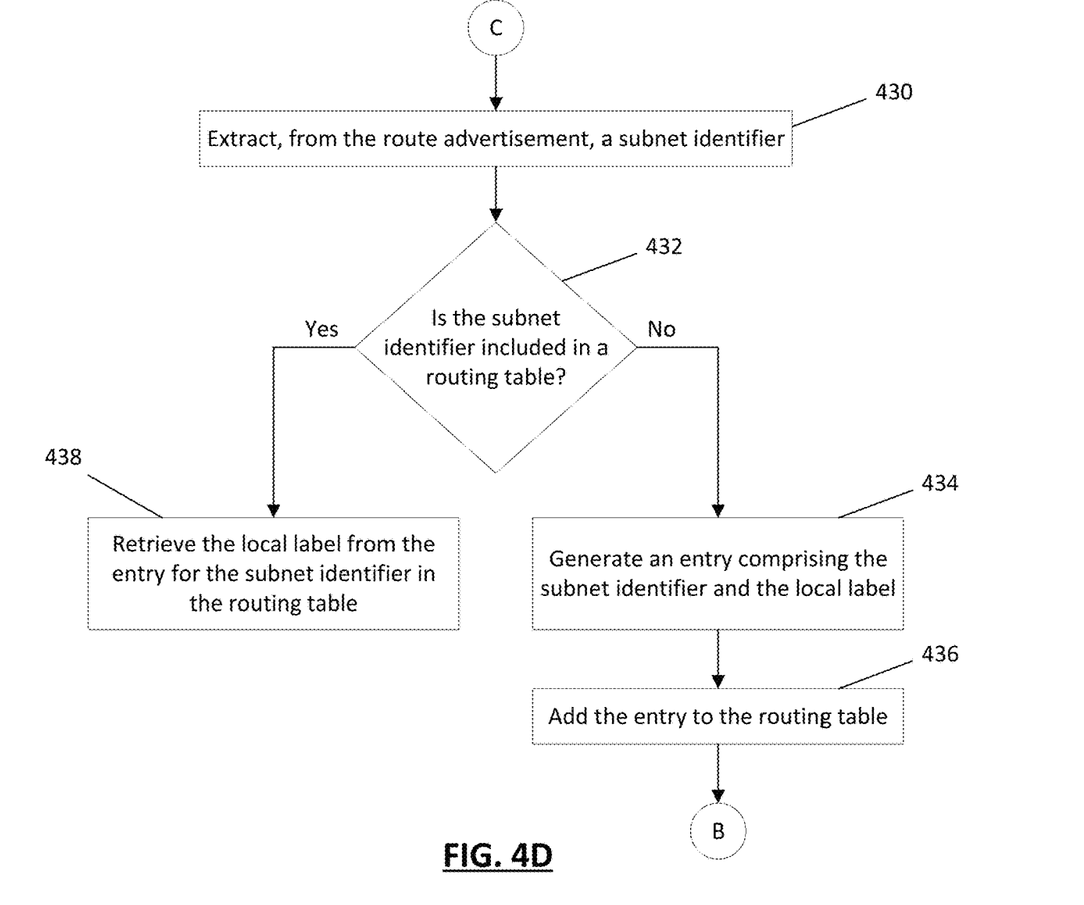
FIG. 4D is a flowchart of showing still further aspects of an illustrative process for maintaining a forwarding table including local labels, in accordance with some embodiments of the present disclosure.

Depending upon the configuration of device 300 at block 405, process 400 may employ a per-prefix mode of operation as discussed herein and proceed to block 430 of FIG. 4D. Otherwise process 400 may proceed to block 406 (e.g., employing a per-NH mode of operation as discussed).

At block 406, control circuitry 304 determines whether a local label has been assigned to the NH identifier-MPLS label combination extracted at block 404. For example, control circuitry 304 may search a forwarding table, such as forwarding table 135, to determine whether the NH identifier-MPLS label combination is included in an entry in the forwarding table. As noted above with reference to FIGS. 1A and 1B, forwarding table 135 includes entries associating local labels with NH identifier-MPLS label combinations. In response to determining that a local label has not been assigned to the NH identifier-MPLS label combination, process 400 proceeds to block 408. In response to determining that a local label has been assigned to the NH identifier-MPLS label combination, process 400 proceeds to block 412.

At block 408, control circuitry 304 assigns a local label to the NH identifier-MPLS label combination and generates a first entry comprising the NH identifier and MPLS label (extracted from the route advertisement 117 at block 404) and the local label assigned to the NH identifier-MPLS label combination. For example, control circuitry 304 assigns the local label 1000 to the NH identifier-MPLS label combination extracted at block 404, and generates an entry including local label 1000 as the key and the NH identifier-MPLS label combination extracted at block 404 as the value.

At block 410, control circuitry 304 adds the first entry generated at block 408 to the forwarding table. For example, control circuitry 304 may store the first entry in forwarding table 135. After block 410, process 400 diverges and may proceed to one or more of blocks 414, 426, and/or 430.

At block 412, control circuitry 304 retrieves, from the forwarding table, the local label assigned to the NH identifier-MPLS label combination extracted at block 404. For example, control circuitry 304 may retrieve the extract, from the entry for the NH identifier-MPLS label combination identified at block 406, the local label assigned to that NH identifier-MPLS label combination. For example, control circuitry 304 may store the first entry in forwarding table 135. After block 410, process 400 diverges and may proceed to one or more of blocks 414, 426, and/or 430.

At block 414, control circuitry 304 receives a second route advertisement advertising a route to the first network (e.g., EVPN 110). Similar to route advertisement 117, the second route advertisement includes a RD identifying EVPN 110, a NH identifier identifying the network device from which the route advertisement is received, and a MPLS label. In this instance, the MPLS label included in the second route advertisement is different from the MPLS label included in route advertisement 117.

At block 416, control circuitry 304 extracts, from the route advertisement received at block 414, a NH identifier-MPLS label combination including a NH identifier and a MPLS label. For example, control circuitry 304 extracts, from the second route advertisement, a NH identifier and a MPLS label that are associated with a route to EVPN 110.

At block 418, control circuitry 304 generates a second entry comprising the first NH identifier-MPLS label combination, the second NH identifier-MPLS label combination, and a second local label. For example, control circuitry 304 may generate a new entry for forwarding table 135 including a different local label from the entry created at block 408 or retrieved at block 412, and add to the entry the NH identifier-MPLS label combination extracted at block 404 and the NH identifier-MPLS label combination extracted at block 416.

At block 420, control circuitry 304 adds the second entry generated at block 418 to the forwarding table. For example, control circuitry 304 may store the second entry in forwarding table 135.

At block 422, control circuitry 304 determines whether another route advertisement comprising the first NH identifier-MPLS label combination has been received. For example, control circuitry 304 may search a data store storing previously received route advertisements to determine if any previously received route advertisements included the NH identifier-MPLS label combination extracted at block 404. In response to determining that another route advertisement comprising the first NH identifier-MPLS label combination has been received, process 400 ends. In response to determining that a previously received route advertisement included the first NH identifier-MPLS label combination, process 400 proceeds to block 424.

At block 424, control circuitry 304 removes the first entry from the routing table. For example, control circuitry 304 may delete the entry added to forwarding table 135 at block 410, or retrieved from forwarding table 135 at block 412.

In some embodiments, as an alternative to the embodiment described with reference to blocks 418-424, control circuitry 304 adds the second NH identifier-MPLS label combination to the existing entry, that is, the entry generated at block 408. In such embodiments, an entry that is initially generated with a single NH identifier-MPLS label combination may later have additional NH identifier-MPLS label combinations added to it and/or removed from it. This allows gateway device 130 to update existing entries for local labels as the NH identifier-MPLS label combinations associated with those local labels change.

At block 426, control circuitry 304 generates a new route advertisement including the local label as the MPLS label and an identifier of network device 300 (e.g., gateway device 130) as the NH identifier. For example, control circuitry 304 may generate a route advertisement advertising a path to EVPN 110, the route advertisement including the RD that was included in the route advertisement received at block 402 and/or block 414, a NH identifier set to an identifier (e.g., a network address or name) of gateway device 130, and a MPLS label set to the local label assigned at block 408 or 418, or retrieved at block 412.

At block 428, control circuitry 304 transmits the new route advertisement to a PE device that has advertised a path to a second network. For example, control circuitry 304 may transmit the route advertisement generated at block 426 to PE device 125 that advertised at path to L3 VPN 120.

At block 430, control circuitry 304 extracts, from the route advertisement a subnet identifier. For example, control circuitry 304 may extract, from the route advertisement received at block 402 and/or 414 an internet protocol (IP) prefix identifying a subnet in EVPN 110.

At block 432, control circuitry 304 determines whether the subnet identifier is included in a routing table. For example, control circuitry 304 may search a routing table stored in storage 308 to determine whether the subnet identifier extracted at block 430 is included in an entry in the routing table. In response to determining that the subnet identifier is not included in any entries in the routing table, process 400 proceeds to block 434. In response to determining that the subnet identifier is included in an entry in the routing table, process 400 proceeds to block 438.

At block 434, control circuitry 304 generates an entry comprising the subnet identifier and the local label. For example, control circuitry 304 generates an entry for the routing table, the entry including the subnet identifier extracted at block 430 as the key and the local label assigned at block 408 or 418, or retrieved at block 412, as the value.

At block 436, control circuitry 304 adds the entry generated at block 434 to the routing table. For example, control circuitry 304 may store the entry in the forwarding table stored in storage 308. Process 300 may then proceed to block 426 of FIG. 4C where control circuitry 304 generates a new route advertisement.

At block 438, control circuitry 304 retrieves the local label from the entry for the subnet identifier in the routing table. For example, control circuitry 304 extracts the local label from the entry for the subnet identifier identified at block 432.

Figure 5A:
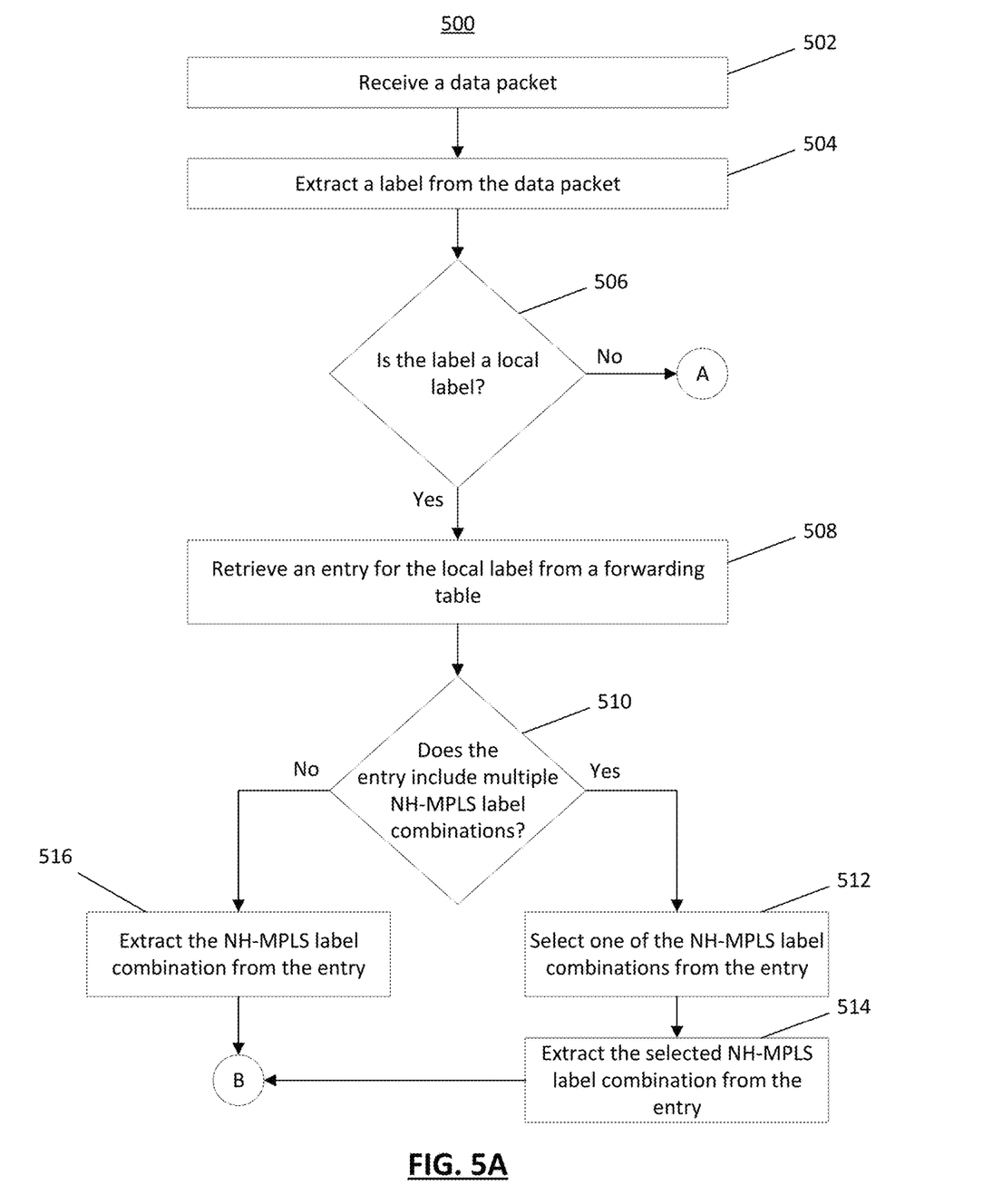
FIG. 5A is a flowchart of an illustrative process for forwarding data packets using local labels, in accordance with some embodiments of the present disclosure.

FIG. 5 is a flowchart of an illustrative process for forwarding data packets using local labels, in accordance with some embodiments of the disclosure. Process 500 may begin at block 502, where control circuitry, such as control circuitry 304 of network device 300 (FIG. 3) receives a data packet. For example, control circuitry 304 receives a data packet from PE device 125. The data packet includes, in a header portion, a MPLS label.

At block 504, control circuitry 304 extracts, from the data packet, a label. For example, control circuitry 304 extracts, from the header portion of the data packet received at block 502, the MPLS label.

At block 506, control circuitry 304 determines whether the label is a local label. For example, control circuitry 304 may search forwarding table 135 using the label extracted at block 504 as a key to determine whether forwarding table 135 includes an entry comprising the label. If forwarding table 135 includes the label, the label is a local label that has previously been assigned by network device 300 (e.g., gateway device 130) to a route. In response to determining that the label is a local label, process 500 proceeds to block 508. In response to determining that the label is not a local label, process 500 proceeds to block 518.

At block 508, control circuitry 304 retrieves an entry for the local label from a forwarding table. For example, control circuitry 304 may retrieve the entry comprising the local label, as identified at block 506, from forwarding table 135.

At block 510, control circuitry 304 determines whether the entry includes multiple NH identifier-MPLS label combinations. For example, control circuitry 304 parses the entry retrieved at block 508 to determine whether the entry includes one or more NH identifier-MPLS label combinations in the value portion of the entry. In response to determining that the entry includes multiple NH identifier-MPLS label combinations, process 500 proceeds to block 512. In response to determining that the entry does not include multiple NH identifier-MPLS label combinations, and thus includes only a single NH identifier-MPLS label combination, process 500 proceeds to block 516.

Figure 5B:
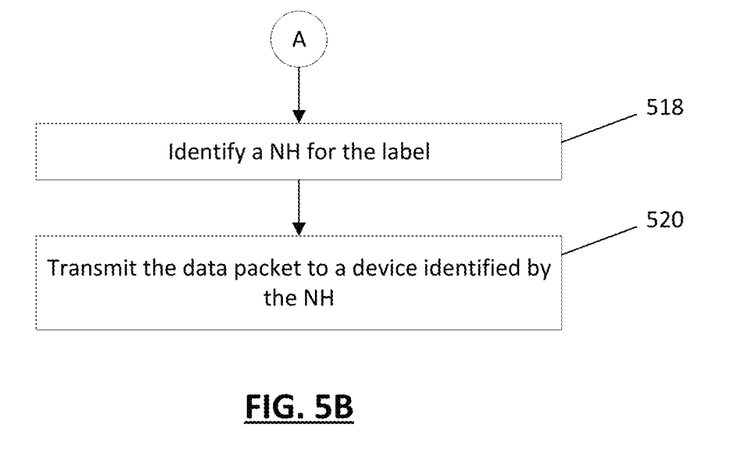
FIG. 5B is a flowchart showing additional aspects of an illustrative process for forwarding data packets using local labels, in accordance with some embodiments of the present disclosure.

At block 512, control circuitry 304 selects one of the NH identifier-MPLS label combinations included in the entry. For example, control circuitry 304 may select a NH identifier-MPLS label combination based on a hash of one or more predetermined fields of the data packet. For example, control circuitry 304 may hash a portion of the header of the data packet including one or more fields, and select the NH identifier-MPLS label combination based on the has result. In some embodiments control circuitry 304 may, during a first iteration, select, from among the NH identifier-MPLS label combinations included in the entry, a given NH identifier-MPLS label combination, and during a second iteration, select a different NH identifier-MPLS label combination. In other embodiments, control circuitry 304 randomizes the selection of the NH identifier-MPLS label combination from the list of NH identifier-MPLS label combinations included in the entry.

At block 514, control circuitry 304 extracts the selected NH identifier-MPLS label combination from the entry. For example, control circuitry 304 extracts, from the entry retrieved at block 508, the NH identifier and MPLS label of the NH identifier-MPLS label combination selected at block 512. Following block 514, process 500 proceeds to block 522.

At block 516, control circuitry 304 extracts the NH identifier-MPLS label combination from the entry. For example, control circuitry 304 extracts, from the entry retrieved at block 508, the NH identifier and MPLS label included in the entry. Following block 516, process 500 proceeds to block 522.

At block 518, control circuitry 304 identifies a NH for the label. Since control circuitry 304 determined at block 506 that the label is not a local label, control circuitry 304 determines that the label is a regular MPLS label, and identifies the NH for MPLS label. For example, control circuitry 304 may retrieve a NH identifier associated with the MPLS label from a routing table and/or forwarding table stored in storage 308.

At block 520, control circuitry 304 transmits the data packet to a device identified by the NH identifier. For example, control circuitry 304 may transmit the data packet to a network device that is associated with the NH identifier identified at block 518.

Figure 5C:
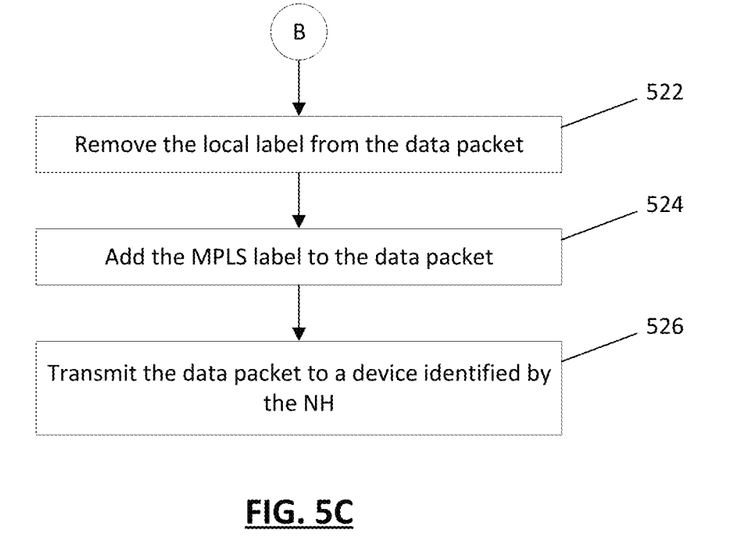
FIG. 5C is a flowchart showing yet further aspects of an illustrative process for forwarding data packets using local labels, in accordance with some embodiments of the present disclosure.

At block 522, control circuitry 304 removes the local label from the data packet. For example, control circuitry 304 may remove (or "pop") the local label (extracted at block 504) from the header portion of the data packet received at block 502.

At block 524, control circuitry 304 adds the MPLS label to the data packet. For example, control circuitry 304 adds (or "pushes") the MPLS label extracted from the entry at block 514 or 516 to the data packet received at block 502.

At block 526, control circuitry 304 transmits the data packet to a device identified by the NH identifier. For example, control circuitry 304 transmits the data packet received at block 502, and as modified at blocks 522 and 524, to a network device identified by the NH identifier extracted from the entry at block 514 or 516.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of generating a table for forwarding traffic between networks that are implemented using different types of control planes, the method comprising: receiving, at a gateway device in a data path between a first network and a second network, a first route advertisement for the first network, wherein the first network is implemented using a first control plane of a first type and the second network is implemented using a second control plane of a second type, and wherein the first type and the second type are different; extracting, from the first route advertisement, a first next hop identifier-multiprotocol label switching (MPLS) label combination comprising a first next hop identifier and a first MPLS label; receiving, at the gateway device, another route advertisement for the first network, the another route advertisement including another next hop identifier-MPLS label combination, the another next hop identifier-MPLS label combination being different than the first next hop identifier-MPLS label combination; determining whether a local label has been assigned to the first next hop identifier-MPLS label combination; and in response to determining that a local label has not been assigned to the first next hop identifier-MPLS label combination: generating a first entry, wherein the first entry comprises a first local label, the first next hop identifier-MPLS label combination, and the another next hop identifier-MPLS label combination, the first local label being associated with the first network; and adding the first entry to a forwarding table of the gateway device.

2. The method of claim 1, further comprising: extracting, from the first route advertisement, a subnet identifier; determining whether the subnet identifier is included in a routing table associating local labels with subnet identifiers; in response to determining that the subnet identifier is not included in the routing table: generating a second entry, wherein the second entry comprises the subnet identifier and the first local label; and adding the second entry to the routing table.

3. The method of claim 2, further comprising in response to determining that the subnet identifier is included in the routing table, retrieving the first local label from an entry for the subnet identifier in the routing table.

4. The method of claim 1, further comprising: receiving a second route advertisement for the first network, wherein the second route advertisement includes a second next hop identifier-MPLS label combination comprising a second next hop identifier and a second MPLS label, and wherein the first next hop identifier and the second next hop identifier are different; generating a second entry, wherein the second entry comprises the first next hop identifier-MPLS label combination, the second next hop identifier-MPLS label combination, and a second local label; and adding the second entry to the forwarding table of the gateway device.

5. The method of claim 4, further comprising removing the first entry from the forwarding table of the gateway device.

6. The method of claim 5, wherein removing the first entry from the forwarding table of the gateway device comprises: determining whether a third route advertisement has been received, the third route advertisement including the first next hop identifier-MPLS label combination; and in response to determining that the third route advertisement has not been received, deleting the first entry from the forwarding table of the gateway device.

7. The method of claim 1, further comprising: receiving a second route advertisement for the first network, wherein the second route advertisement includes a second next hop identifier-MPLS label combination comprising a second next hop identifier and a second MPLS label, and wherein the first next hop identifier and the second next hop identifier are different; and adding the second next hop identifier-MPLS label combination to the first entry.

8. The method of claim 1, wherein determining whether a local label has been assigned to the first next hop identifier-MPLS label combination comprises: determining whether the forwarding table includes a second entry comprising the first next hop identifier and the first MPLS label; and in response to determining that the forwarding table includes the second entry, extracting, from the second entry, a local label.

9. The method of claim 1, further comprising in response to determining that the first local label has been assigned to the first next hop identifier-MPLS label combination, retrieving the first local label from the forwarding table of the gateway device.

10. The method of claim 1, wherein the another route advertisement is received at the gateway device before the first route advertisement.

11. A method for routing traffic between networks that are implemented using different types of control planes, the method comprising: receiving, at a network device, a first route advertisement or a first network that is implemented using a first control plane of a first type; extracting, from the first route advertisement, a next hop identifier-multiprotocol label switching (MPLS) label combination comprising a next hop identifier and a MPLS label; receiving, at the gateway device, another route advertisement for the first network, the another route advertisement including another next hop identifier-MPLS label combination, the another next hop identifier-MPLS label combination being different than the next hop identifier-MPLS label combination; determining whether a local label has been assigned to the next hop identifier-MPLS label combination; and in response to determining that a local label has not been assigned to the next hop identifier-MPLS label combination: generating an entry, wherein the entry comprises a local label, the next hop identifier-MPLS label combination, and the another next hop identifier-MPLS label combination, the local label being associated with the first network; and adding the entry to a forwarding table; generating a second route advertisement in which the MPLS label is replaced with the local label and the next hop identifier is set to an identifier of the network device; and transmitting the second route advertisement to a provider edge device that advertised a path to a second network that is implemented using a second control plane of a second type, wherein the first type and the second type are different.

12. The method of claim 11, further comprising, in response to determining that a local label has been assigned to the next hop identifier-MPLS label combination, retrieving the local label assigned to the next hop identifier-MPLS label combination from the forwarding table.

13. The method of claim 11, further comprising: receiving a data packet; extracting, from the data packet, a label; determining whether the extracted label is the local label; and in response to determining that the extracted label is the local label; removing the label from the data packet, selecting one of the next hop identifier-MPLS label combination and the another next hop identifier-MPLS label combination; adding the MPLS label from the selected one of the next hop identifier-MPLS label combination and the another next hop identifier-MPLS label combination to the data packet, and transmitting the data packet to a device having the next hop identifier.

14. The method of claim 13, further comprising retrieving, from the forwarding table, the next hop identifier-MPLS label combination and the another next hop identifier-MPLS label combination.

15. The method of claim 14, wherein retrieving the next hop identifier-MPLS label combination and the another next hop identifier-MPLS label combination comprises: searching the forwarding table using the local label as a key; identifying the entry corresponding to the local label; and extracting, from the entry, the next hop identifier-MPLS label combination and the another next hop identifier-MPLS label combination.

16. A method in a gateway device in a data path between a first network and a second network comprising:
   receiving a data packet; and
   forwarding the data packet to a device based on an entry in a forwarding table, wherein the entry is produced by a method comprising:
      receiving a first route advertisement for the first network, wherein the first network is implemented using a first control plane of a first type and the second network is implemented using a second control plane of a second type, and wherein the first type and the second type are different;
      extracting, from the first route advertisement, a first next hop identifier-multiprotocol label switching (MPLS) label combination comprising a first next hop identifier and a first MPLS label;
      receiving another route advertisement for the first network, the another route advertisement including another next hop identifier-MPLS label combination, the another next hop identifier-MPLS label combination being different than the first next hop identifier-MPLS label combination;
      determining a local label has not been assigned to the first next hop identifier-MPLS label combination;
      generating the entry, wherein the entry comprises a first local label, the first next hop identifier-MPLS label combination, and the another next hop identifier-MPLS label combination, the first local label being associated with the first network; and
      adding the entry to the forwarding table.

17. The method of claim 16, further comprising:
   extracting from the data packet a local label;
   retrieving the entry based on the local label, the entry including a plurality of next hop identifier-multiprotocol label switching (MPLS) label combinations;
   selecting a next hop identifier-MPLS label combination of the plurality of next hop identifier-multiprotocol label switching (MPLS) label combinations;
   removing the local label from the data packet; and
   adding an MPLS label of the selected next hop identifier-MPLS label combination to the data packet.

18. The method of claim 16, wherein the data packet is received from a provider edge device that advertised a path to the first network.

19. The method of claim 16, wherein the another route advertisement is received before the first route advertisement.

* * * * *